March 31, 1953     G. A. BUTTRESS     2,633,441
METHOD OF MAKING PERFORATED COMPOSITION PLASTERBOARD
Filed Aug. 7, 1950
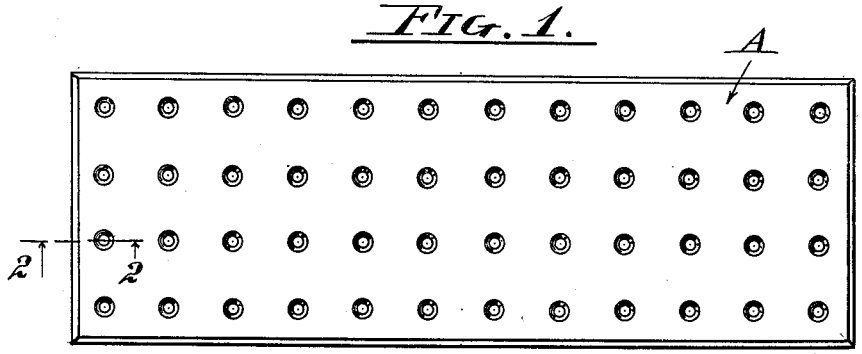
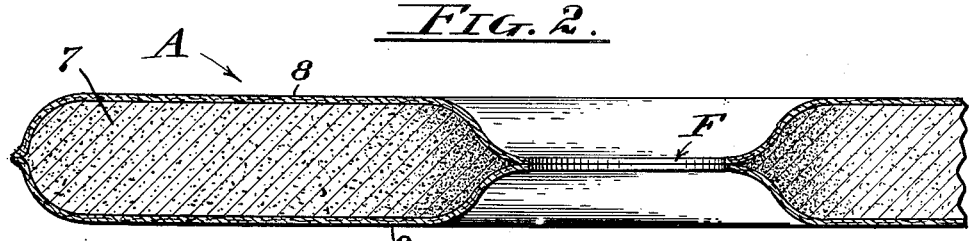
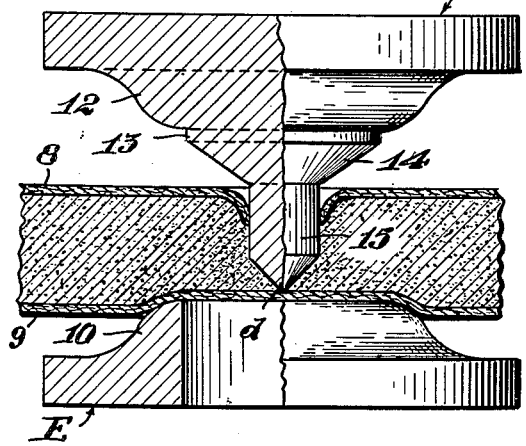
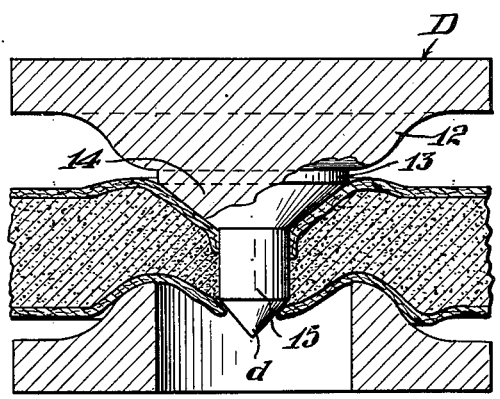
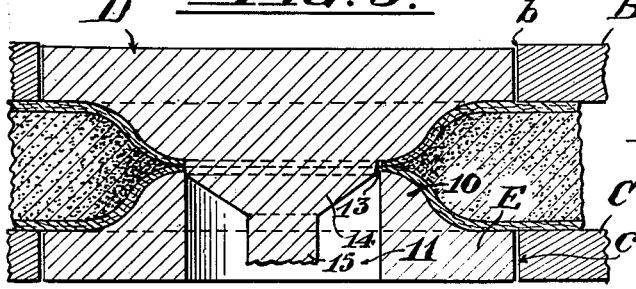
Inventor
George A. Buttress;
By R. S. Berry
Attorney Patented Mar. 31, 1953

2,633,441

UNITED STATES PATENT OFFICE 2,633,441

METHOD OF MAKING PERFORATED COMPOSITION PLASTERBOARD

George A. Buttress, Los Angeles, Calif.

Application August 7, 1950, Serial No. 178,152

3 Claims. (Cl. 154—87)

This invention relates to a plaster board of the character used as a lath or backing for plaster which board embodies a layer of hardened plaster covered on each side thereof with facing sheets formed of paper, pulp board and the like, and has as its primary object the method of forming the board with plaster receiving openings whereby the portions of the board surrounding the openings are completely sealed by the paper facing sheets.

In the manufacture of apertured plaster boards it is now common practice to form holes in the board by punching the board to remove circular portions of the facing sheets and the plaster layer so as to form the board with circular or cylindrical openings the walls of which consist of the edges of the facing sheets and of exposed portions of plaster extending between the facing sheets.

This exposed plaster is highly objectionable since the plaster is water absorptive and accordingly draws water from wet plaster applied to the board such as to materially weaken the plaster body penetrating the openings and also resulting in a change in the character of the plaster extending through the openings compared with that extending between the openings in the finished wall, such that the surface of the finished plaster will have a different appearance and will be more porous and absorptive opposite the openings in the plaster board than that of surrounding areas, and which may become manifested in surface coatings or wall finishes applied to the plaster.

Because of this objectionable feature of the exposed plaster areas in the perforations of the board it is highly desirable to eliminate such exposed plaster areas. This is accomplished by the present invention by bringing the facing sheets of opposite sides of the plaster board together mid-way of the opposed faces of the board at suitable spaced areas throughout the board, while the plaster body between the facing sheet is moist, soft and compressible, and then punching holes through the abutting portions of the facing sheet and in a fashion to pinch the portions of the facing sheet forming the margins of such holes into intimate engagement with each other and at the same time compress and render more compact the portion of the plaster within the board immediately surrounding the holes in the paper to render the plaster more compact around the openings, which with the reinforcing effect of the inturned portions of the facing sheet forming the margins of the openings, greatly strengthens and reinforces the board against breakage along the rows of the perforations formed therein which ordinarily constitute lines of weaknes.

The invention is illustrated in the accompanying drawing in which:

Fig. 1 is a view in elevation of a perforated plaster board having the perforations formed therein in accordance with the invention;

Fig. 2 is an enlarged detail in section taken on the line 2—2 of Fig. 1;

Fig. 3 is a sectional view partly in elevation showing the initial step of forming a perforation in the board by a punch and die operation;

Fig. 4 is a sectional view similar to Fig. 3 showing an intermediate stage of the punching operation;

Fig. 5 is a sectional view similar to Figs. 3 and 4 showing the completion of the punching operation, resulting in the formation of the perforations in the board illustrated in Fig. 2.

In carrying out the invention a panel A of plaster board is formed in the conventional, or any other suitable fashion, to produce a board composed of a plaster layer 7 covered on opposite side thereof with facing sheets 8 and 9 formed of paper, pulp board, or the like, as is common in plaster board and wall board construction. Before setting of the plaster 7 and while it is soft, wet and compressible, and at which time the fibrous facing sheets 8 and 9 are moist and readily deformable, the panel A is placed between the members B and C of a press which is brought to bear against the opposed surfaces of the board as shown in Fig. 5, so as to confine the board against outward distortion. The press members B and C are formed with circular openings b—c to receive punch and die members D and E respectively, which members are designed to be advanced toward each other from opposite sides of the board confined between the press members D and C, as indicated in Figs. 3, 4 and 5. The die E embodies an annular bead 10 of outwardly curved cross section at its outer portion surrounding a cylindrical opening 11; the bead 10 having its inner external portion formed on a reverse curve merging in a plane surface. The punch D embodies a forming projection 12 opposing the forming bead 10 of the die E and contoured in section complementary to the bead 10 with an outwardly and upwardly curved portion terminating in a reverse curve leading to a plane; the outwardly curved portion leading from the peripherial face of a cylindrical punch 13 movable into the opening 11 in the die E, on which punch is formed a frustro-conical forming member 14 terminating in a pilot punch 15 having a cylindrical body portion terminating in a sharp pointed conical end d.

On advancing the punch and die toward each other on opposite sides of the soft and wet plaster board A, the pilot punch 15 will initially penetrate the upper facing sheet 8 and enter the soft plaster layer 7. At the same time the die E is moved upwardly against the lower facing sheet 9 and indents the latter into the plaster layer, which with the downwardly moving pilot punch 15 and the frustro-conical forming member 14 then indenting the upper facing sheet 8, displaces the portion of the plaster body surrounding the pilot punch 15. A part of the displaced plaster may pass downwardly under the thrust of the punch and enter the opening 11, as the pilot punch 15 penetrates the lower facing sheet 9. Continued movement of the punch and die toward each other brings the facing sheets 8 and 9 together between the convex forming portions of the punch and die, at which point the punch 13 will have entered the upper end of the cylindrical opening 11 in the die E thereby severing circular pieces from the abutting facing sheets 8 and 9, thus forming a circular opening F therein.

In this operation portions of the facing sheets 8 and 9 forming the margin of the opening F are tightly pressed together in intimate engagement with each other by the forming members 12 and 10 of the punch and die, and at the same time the portions of the plaster layer 7 extending between the punch and die will have become compressed and compacted by reason of the plaster layer being confined between the forming members 12 and 10 of the punch and die D and E and between the press members B and C. The plaster layer 7 being soft and wet during this operation, permits of the desired compression and compacting thereof, and the fibrous facing sheets 8 and 9 being wet, are readily stretched and deformed to bring them into contact with each other from opposite sides of the board around the openings therein so as to form paper seals for the sides of such openings.

It is to be noted that both the plaster layer and the facing sheets are readily compressible and deformable while wet, moist or damp and that the facing sheets and plaster layer adhere to each other by reason of an inherent adhesive property in the plaster which is sufficient to cause the compressed edges of the facing sheet forming the margins of the openings F to tightly adhere together.

After completion of the operation above described, the punches and dies are retracted, as are the press members B and C, whereupon the formed board is dried, or allowed to dry, whereby the plaster layer becomes hard and rigid as does the facing sheets in the manner incident to plaster boards of this character.

I claim:

1. The method of forming a perforated plaster board consisting in forming a plaster board panel consisting of a soft, wet compressible plastic layer covered on opposite sides thereof with moist facing sheets of fibrous material, depressing spaced circular areas of said facing sheets into the plastic layer from opposite sides thereof, bringing circular areas of the opposed facing sheets into overlying superficial contact with each other intermediate the sides of the plastic layer, punching circular holes in the contacting portions of said sheets, and compressing the overlying contacting portions of the sheet constituting the margins of said holes into intimate abutting sealed relation to each other to completely seal the portions of the plastic body surrounding said holes by the overlying contacting portions of the opposed facing sheets.

2. The method of forming a perforated plaster board consisting in forming a plaster board panel consisting of a soft, wet compressible plastic layer covered on opposite sides thereof with moist facing sheets of fibrous material, depressing spaced circular areas of said facing sheets into the plastic layer from opposite sides thereof and coincidently forming openings through said plaster board centrally of said areas, bringing circular areas of the opposed facing sheets into superficial contact with each other intermediate the sides of the plastic layer, punching circular holes in the contacting portions of said sheets, and compressing the contacting portions of the sheet constituting the margins of said holes into intimate abutting sealed relation to each other and simultaneously confining, compressing and compacting portions of the plastic body immediately adjoining the circular depressed portions of the facing sheet.

3. The method of forming a perforated plaster board consisting in initially forming a panel of soft, moist plastic material with fibrous facing sheets on opposite sides thereof capable of absorbing moisture from the moist plastic material and when moistened of being stretched and deformed, then while the plastic material is soft and the facing sheets are moist pressing a panel thus formed throughout the surfaces thereof except at spaced circular areas, indenting the facing sheets into the soft plastic layer at such aforesaid circular areas, and bringing the indented portions of the sheets into intimate contact with each other intermediate the thickness of the plastic body, punching circular openings through the abutting portions of the facing sheets, and coincidently compressing the portions of the facing sheets constituting the margins of said openings into abutting engagement with each other throughout and at the same time compressing and compacting portions of the plastic body immediately abutting the indented portions of the facing sheets.

GEORGE A. BUTTRESS.

REFERENCES CITED

The following references are of record in the file of this patent:

UNITED STATES PATENTS

| Number | Name | Date |
| --- | --- | --- |
| 1,464,360 | Hicks | Aug. 7, 1923 |
| 2,352,194 | Grabec | June 27, 1944 |
| 2,479,207 | Buttress | Aug. 16, 1949 |